US008909182B2

(12) United States Patent
Milosevic

(10) Patent No.: US 8,909,182 B2
(45) Date of Patent: Dec. 9, 2014

(54) PHYSICALLY SMALL TUNABLE NARROW BAND ANTENNA

(75) Inventor: Svetlan Milosevic, Toronto (CA)

(73) Assignee: ATI Technologies ULC, Ontario (CA)

( * ) Notice: Subject to any disclaimer, the term of this patent is extended or adjusted under 35 U.S.C. 154(b) by 220 days.

(21) Appl. No.: 13/411,073

(22) Filed: Mar. 2, 2012

(65) Prior Publication Data

US 2012/0162533 A1 Jun. 28, 2012

Related U.S. Application Data

(62) Division of application No. 12/147,149, filed on Jun. 26, 2008, now Pat. No. 8,144,064.

(51) Int. Cl.
*H04B 1/18* (2006.01)
*H01Q 1/24* (2006.01)
*H01Q 9/14* (2006.01)
*H04B 1/26* (2006.01)

(52) U.S. Cl.
CPC ............... *H01Q 9/145* (2013.01); *H01Q 1/242* (2013.01)
USPC ........................................ 455/193.1; 343/745

(58) Field of Classification Search
CPC .................................. H01Q 9/145; H04B 1/18
USPC ..................... 455/193.1–193.3; 343/745, 752
See application file for complete search history.

(56) References Cited

U.S. PATENT DOCUMENTS 4,701,732 A * 10/1987 Nestlerode ...................... 334/56
5,872,489 A 2/1999 Chang et al.
6,255,994 B1 7/2001 Saito
7,151,501 B2 12/2006 Tran
2006/0214857 A1 9/2006 Ollikainen
2008/0305749 A1 12/2008 Ben Bassat
2008/0305750 A1 12/2008 Alon et al.

OTHER PUBLICATIONS

European Telecommunications Standard Institute, “Digital Video Broadcasting (DVB); Transmission System for Handheld Terminals (DVB-H)”, ETSI EN 302 304, V1.1.1, (Nov. 2004).

Holopainen, “Antenna for Handheld DVB Terminal”, Helsinki University of Technology, Department of Electrical and Communications Engineering, Radio Laboratory, Master’s Theses, (2005).

Huang et al, “Tunable Antenna Design Procedure and Harmonics Suppression Methods of the Tunable DVB-H Antenna for Mobile Applications”, European Microwave Conference, 2007, pp. 1062-1065, (Oct. 9-12, 2007).

Jackson et al., “Simple Approximate Formulas for Input Resistance, Bandwidth, and Efficiency of a Resonant Rectangular Patch”, IEEE Transactions on Antennas and Propagation, vol. 39, No. 3, pp. 407-410, (Mar. 1991).

* cited by examiner

*Primary Examiner* — Lee Nguyen
(74) *Attorney, Agent, or Firm* — Volpe and Koenig, P.C.

(57) ABSTRACT

A narrow band, tunable antenna uses a series of small inductors wired in series to produce different resonant frequencies from a single antenna across a wide frequency spectrum. Radio Frequency (RF) switches are positioned in parallel with the inductors and are capable of shunting a selected inductor out of the antenna circuit thereby changing the electrical length of the antenna and consequently, the resonant frequency. The RF switch control circuitry is isolated from the RF current in the antenna.

18 Claims, 8 Drawing Sheets

PHYSICALLY SMALL TUNABLE NARROW BAND ANTENNA

CROSS REFERENCE TO RELATED APPLICATIONS

This application is a divisional of U.S. patent application Ser. No. 12/147,149 filed on Jun. 26, 2008, which is incorporated by reference herein as if fully set forth.

FIELD OF INVENTION

The present invention relates generally to reception of digital television broadcasts. More particularly, the invention relates to reception of Digital Video Broadcast for Handheld (DVB-H) signals.

BACKGROUND

The term portable "hand-held" wireless device was, at one time, reserved for small, personal digital assistants (PDAs) or cell phones. However, these portable devices have expanded well beyond simple telephonic communications and now support a broader array of applications. Cameras, music players and Internet browsers are commonplace in portable devices.

Another technology that is rapidly making its way into portable devices such as cell phones is digital television. The standard defining digital television in portable devices is the Digital Video Broadcast-Handheld (DVB-H) standard. One of the challenges associated with providing DVB-H to handheld devices is the antenna necessary to receive the broadcast signal.

An antenna, when used to receive signals, converts electromagnetic waves into voltage. The antenna is a conductor placed within an electromagnetic field to induce a voltage that carries the received signal. The antenna is most efficient when the electrical length of the antenna is equal to the wavelength of the signal that is desired to be received. The resonant frequency of the antenna is related to its electrical length, and defines the frequency at which the antenna is tuned when receiving an electromagnetic field. The bandwidth of the antenna is the range of frequencies over which the antenna is effective, generally centered upon the resonant frequency. The resonant frequency may be changed by changing the electrical length of the antenna.

Traditional resonant antennas without any adjustments would be useful in a very small part of the DVB-H spectrum (450-702 MHz). The reception/transmission efficiency of the signals away from an antenna's resonant point may be increased by creating stubs near the feeding point. These stubs produce equal and opposite reflections to the reflections created by the impedance mismatch that exists between the antenna and the input circuitry away from resonance. Many alternative topologies use the tuning these stubs in order to achieve effective wideband operation.

Another known approach involves designing wideband patch antennas. The problem associated with this approach is the thickness requirement to achieve the desired bandwidth as discussed in ("BW~patch/thickness/lambda", David R Jackson, formula (44) from IEEE Transactions on Antennas and Propagation, vol. 39, No. 3, March 1991). After widening the bandwidth to more than 10%, the radiation efficiency drops very quickly and for DVB-H the bandwidth needed exceeds 40%. Therefore, the necessary increase in thickness decreases efficiency and the resulting increased volume taken up by the antenna makes them less appealing for small, handheld devices. It would be beneficial to have a small, tunable antenna to address these drawbacks.

SUMMARY

A physically small helical, meander, spiral, or other suitable antenna for receiving DVB-H broadcasts uses a number of small inductors in series to control its electrical length. The antenna's 2:1 Voltage Standing Wave Ratio (VSWR) is about 20-30 MHz wide. The DVB-H spectrum, as shown earlier, is about 10 times wider. The antenna could receive different 20-30 MHz segments of the spectrum if its resonance point could be tuned across the DVB-H spectrum. This can be achieved by adding/removing series inductors to/from the antenna circuitry. The series inductors that increase the electrical length of the antenna are selectively shunted through the use of RF switches. Shunting each inductor reduces the electrical length of the antenna. The RF switches used in the antenna circuitry have very low off-state capacitance to reduce their influence when they are switched out. Switches in off-position and series inductors are creating LC tanks along the antenna resulting in additional impedance to signals of interest. The higher these parasitic resonances, the smaller their influence on signals in the DVB-H spectrum. The switches are utilized to selectively switch inductors in and out of the antenna circuitry thereby lengthening or shortening the electrical length of the antenna and subsequently lowering or raising the resonant point of the antenna without adversely affecting the antenna impedance. By changing the electrical length of the antenna in this manner, a single, small antenna may be used to receive multiple frequency ranges across a wide band frequency spectrum.

BRIEF DESCRIPTION OF THE DRAWINGS

A better understanding of the embodiments may be had in view of the accompanying drawings where like elements are indicated by like numerals and wherein.

DETAILED DESCRIPTION OF THE PREFERRED EMBODIMENTS

Figure 1:
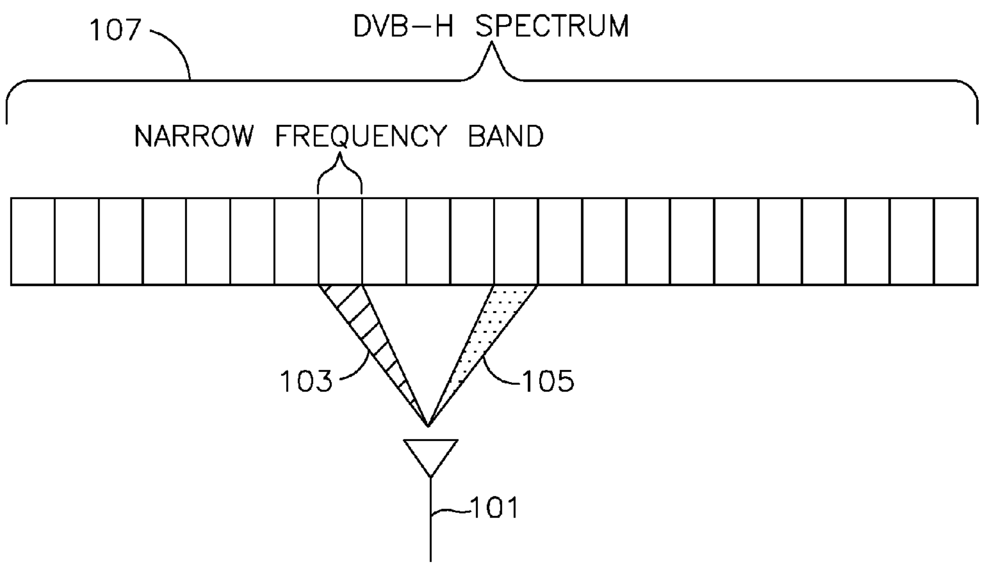
FIG. 1 is an illustration of a tunable antenna.

FIG. 1 is an illustration of an antenna 101 that is tunable and receives signals in a narrow bandwidth 103, 105. The resonant frequency of the antenna may be changed by electrically lengthening or shortening the antenna in a manner that will be described in more detail below. In this example, the target spectrum is the Digital Video Broadcast for Handheld (DVB-H) 107. The electrical length of an antenna 101 determines the frequencies it efficiently receives/transmits. The longer the electrical length, the lower the operating frequency. By adding lengtheners to the antenna 101 circuitry, a lower frequency range will be received as depicted by narrow bandwidth 103. By selectively removing lengtheners, it is possible to shorten the electrical length of the antenna 101, causing its resonance frequency to increase and tuning it to a different, higher frequency range 105.

Figure 2:
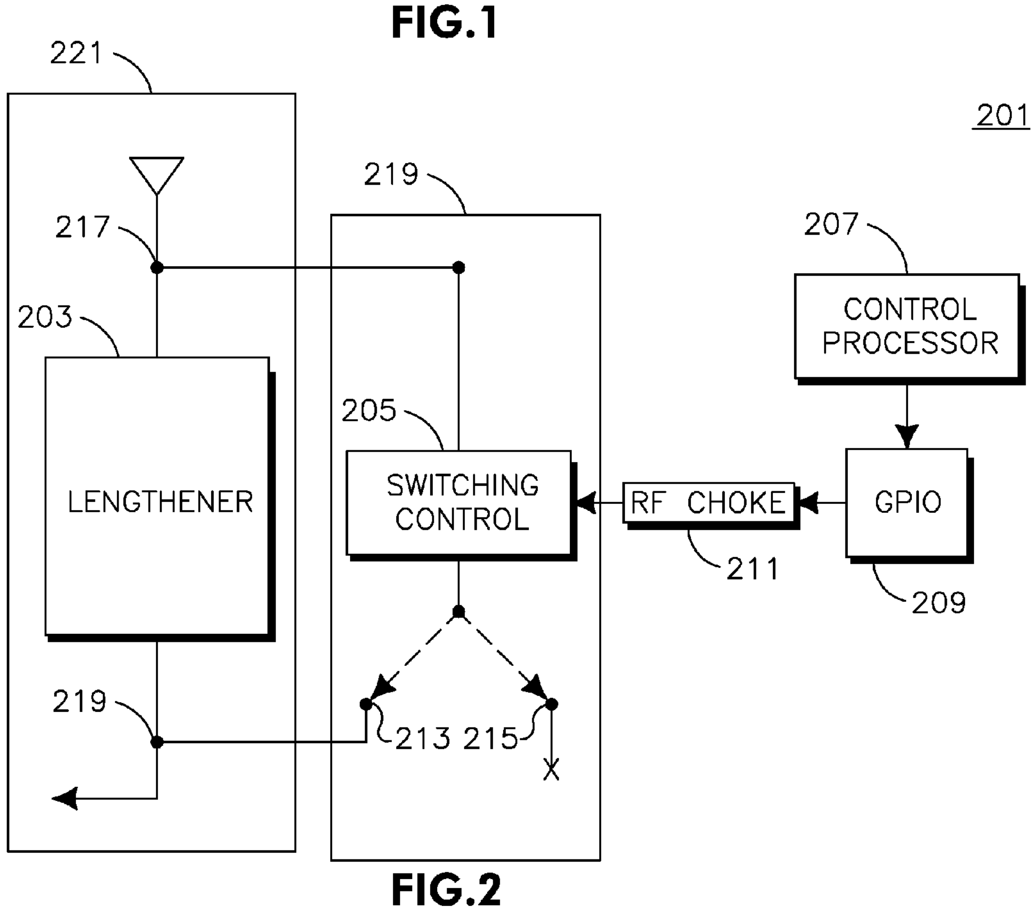
FIG. 2 is a block diagram of a general depiction of a tunable antenna.

A block diagram depicting a tunable antenna 201 according to the present invention is shown in FIG. 2. The tunable antenna 201 comprises a control processor 207 that controls a general purpose input/output device (GPIO) 209 that sends a control signal through an RF choke 211 to the switching control 205 of an RF switch 219 that can selectively add or remove lengtheners 203 to the antenna circuitry 221. Tunable antenna 201 receives broadcast signals through the antenna circuitry 221. In-line with the antenna circuitry 221, an antenna lengthener 203 is added. While one lengthener is shown for the sake of simplicity, any number of small lengtheners 203 may be added to allow greater control over the overall electrical length of the antenna 201.

In parallel with each lengthener 203, an RF switch 219 controlled by switching control 205 is connected. The RF switch 219 may complete a connection between electrical contact point 217 and either electrical connection point 213, or alternatively, electrical connection point 215. The position of the RF switch 219 determines whether the lengthener 203 is included as part of the antenna 201 or not. When the switching control 205 places the RF switch 219 in a closed position, the electrical contact is with connection point 213 and an electrical short is created between electrical connection points 207 and 219. An electrical short between electrical connection points 207 and 219 causes RF energy received by the antenna circuitry 221 to be shunted around the lengthener 203 thereby decreasing the electrical length of the antenna circuitry 221.

RF switch 219 is controlled by a control processor 207, which may be the host processor of a handheld device such as a cell phone. The GPIO 209 sends a control signal to the switching control 205 through a radio frequency (RF) choke 211. The RF choke 211 isolates the direct current (DC) control signal that activates the switching control 205 from the RF current that is received by the antenna circuitry. This isolation permits the switching control 205 to add/remove lengtheners 203 to/from the antenna circuitry 219 without influencing it with spurious reactance.

Figure 3A:
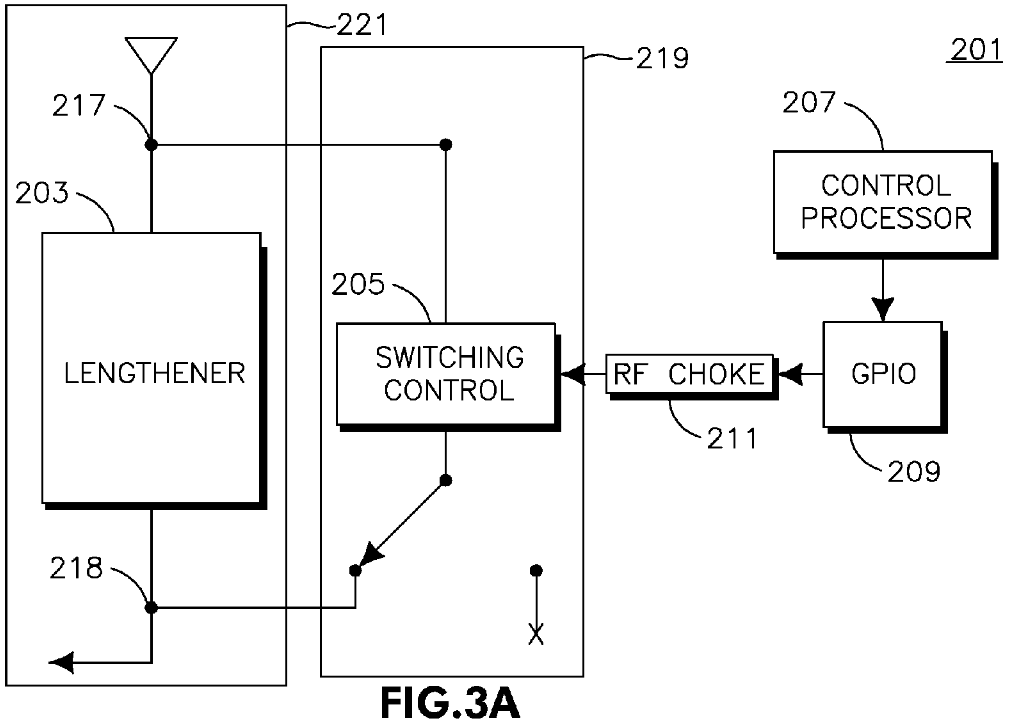
FIG. 3A is a block diagram of a tunable antenna with a shortened electrical length.

Referring to FIG. 3A, a tunable antenna 201 is shown where the switching control 205 has the RF switch 219 in a closed position. In the closed position, the RF switch 219 creates an electrical short between contact points 217 and 218, effectively shunting the lengthener 203. RF current from the antenna circuitry 221 passes around the lengthener 203 thereby electrically removing the lengthener 203 from the antenna circuitry 221 and shortening the electrical length of the tunable antenna 201. This shorter electrical length causes the resonant frequency of the tunable antenna 201 to increase and the tunable antenna 201 will be tuned to a relatively higher band of frequencies.

Figure 3B:
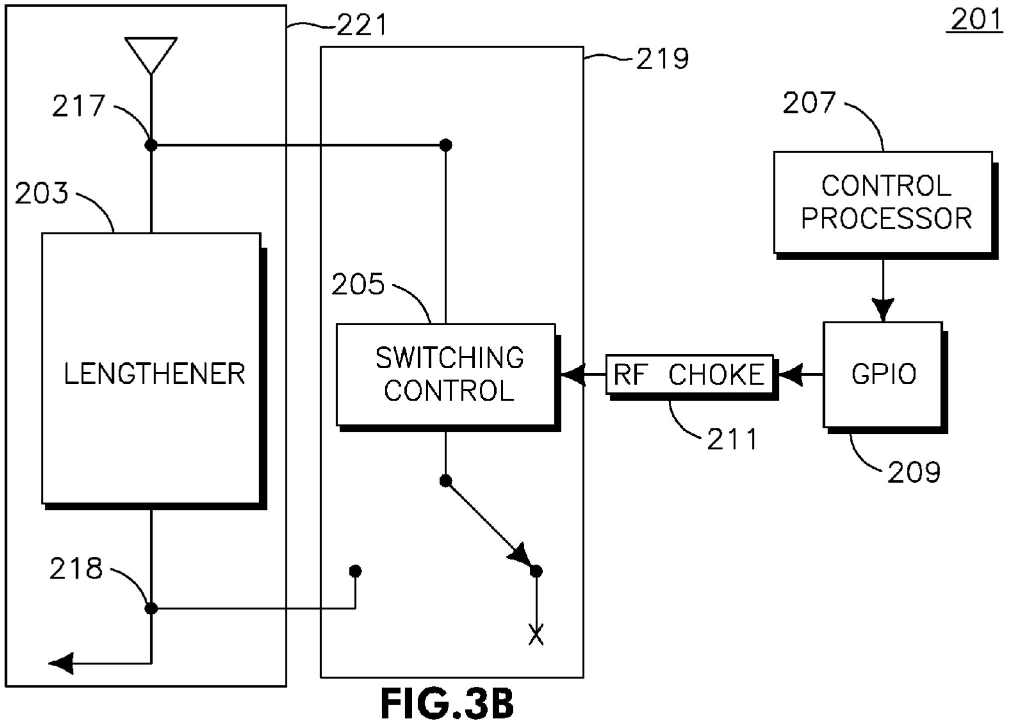
FIG. 3B is a block diagram of a tunable antenna with a lengthened electrical length.

The tunable antenna 201 depicted in FIG. 3A where the RF switch 219 is in an open position is shown in FIG. 3B. The RF current now passes through the lengthener 203. This increases the electrical length of the tunable antenna 201 and lowers its resonant frequency, tuning it to a lower part of the DVB-H spectrum.

Figure 4:
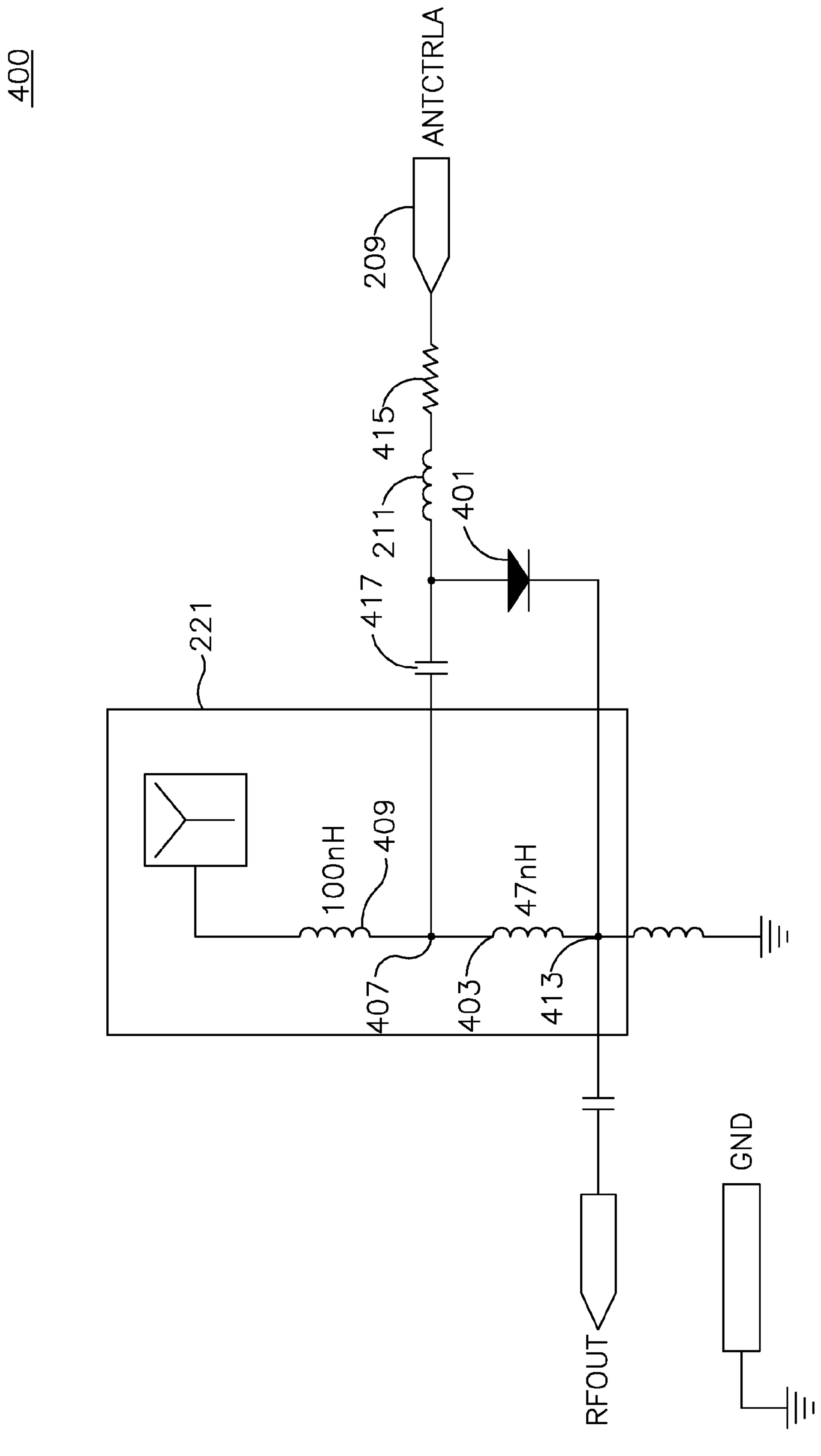
FIG. 4 is an example schematic of a switching control used to lengthen or shorten a tunable antenna.

FIG. 4 shows an example implementation schematic of a tunable antenna. For simplicity, one lengthener 403 is shown, but more than one lengthener 403 may be used. The RF switch 401 adds/removes an inductor (lengthener) 403 to/from the antenna circuit 221 and second inductor 409 and thereby lengthens or shortens the electrical length of the antenna 400. The RF switch 401 is implemented using a Positive Intrinsic Negative (PIN) diode 401. The control signal 209 provides forward bias to the PIN diode 401 (sufficiently high positive voltage on the anode with respect to the cathode, 3.3 volts in the example of FIG. 4). When the diode is forward biased it becomes conductive and shunts the inductor 403 between points 407 and 413. Shunting the inductor 403 shortens the electrical length of the antenna 400 and moves its resonance point to a higher frequency. RF choke 211 is isolating the antenna from the spurious influences of the controlling circuitry. Resistor 415 limits forward current through the PIN diode. A blocking capacitor 417 passes RF current but prevents DC shorting of the controlling signal through the antenna circuitry to ground.

Figure 6A:
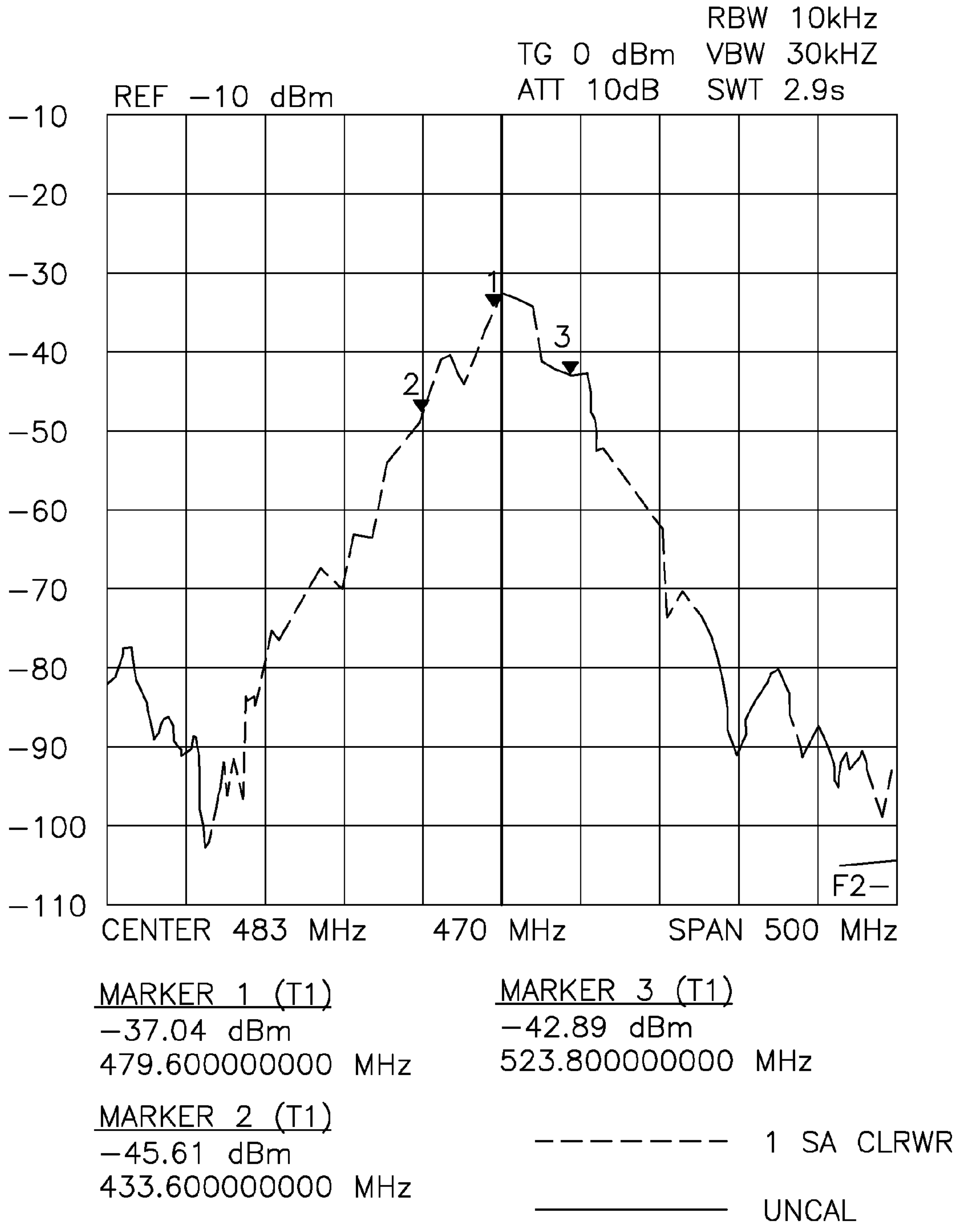
FIG. 6A is an illustration of a spectrum analyzer screen output showing the response of the circuit where a 0V potential is applied to AntCtrlA in FIG. 4.
Figure 6B:
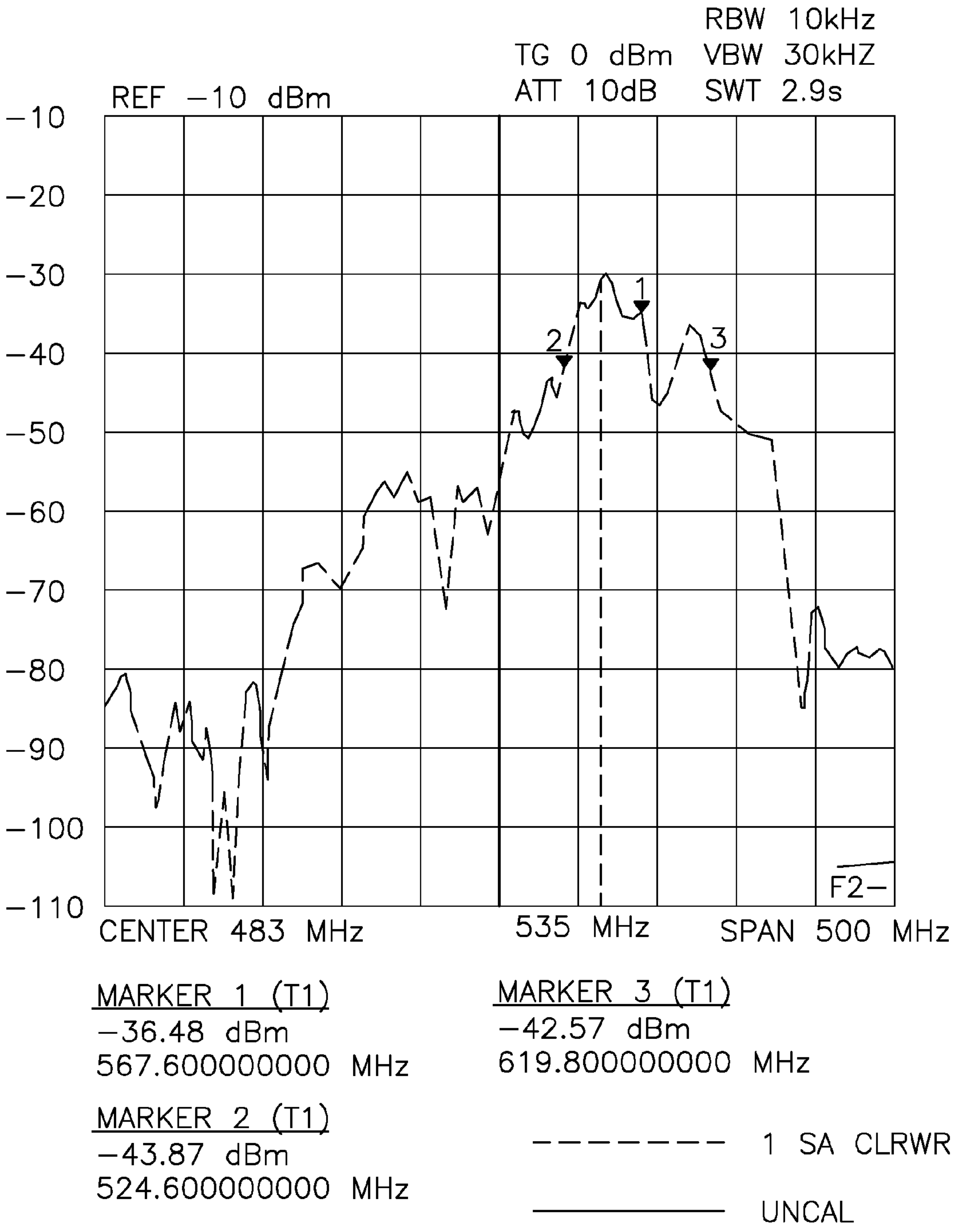
FIG. 6B is an illustration of a spectrum analyzer screen output where a 3.3V potential is applied to AntCtrlA in FIG. 4.

The circuit response of the example above is measured with the spectrum analyzer and the screen capture of this measurement is shown in FIGS. 6A and 6B.

In the case when the Control signal 209 is 0 volts, PIN diode 401 appears as an open switch and the RF current flows through the inductor 403 effectively increasing the electrical length of the antenna and lowering the resonance point (spectrum analyzer screen shown in FIG. 6A). In this case, it is important that the switch (PIN diode) 413 in its open state, exhibits very low capacitance for the reasons explained earlier. In this case, PIN diode 401 is chosen as an effective switch because it has lower off-state capacitance than regular diodes.

Improved performance may be achieved when the PIN diode 401 is negatively biased as a negative bias creates a smaller capacitance across the PIN diode 401 than a zero bias state, thereby further increasing the resonant point of the spurious LC tank created by the inductor 403 and a negatively biased diode 413. However, any RF switch that has the property of low capacitance when in an open state is suitable for use as described and would be within the scope of what is considered to be the invention.

As FIGS. 6A and 6B illustrate, changing the inductance from 147 nH to 100 nH results in raising the resonant point from 470 MHz to 535 MHz.

The example shown in FIG. 4 depicts a single cell switch for ease of explanation, but one skilled in the art will recognize that any number of smaller inductors may be used in series in an antenna and selectively shunted or added to the antenna circuitry to achieve a wider spectrum of frequencies over which the antenna may be tuned, closer proximity of resonant points between subsequent ranges, or a combination of the two. A plurality of GPIOs may be employed to control the addition or removal of additional series inductors.

Figure 5:
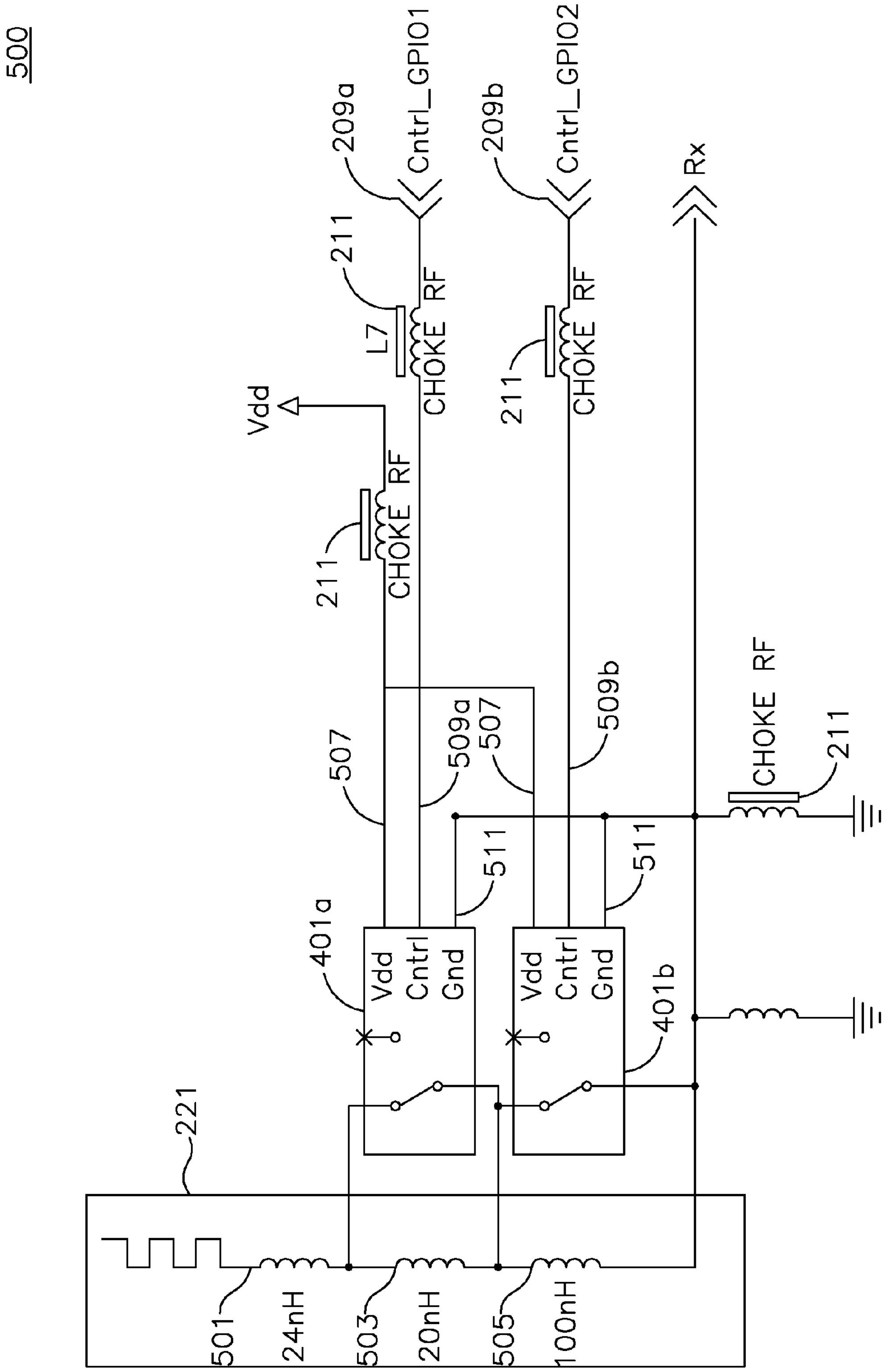
FIG. 5 is a schematic depicting a tunable antenna.

Referring now to FIG. 5, a tunable antenna circuit 500 is depicted having two tunable lengtheners 503, 505. The antenna circuitry 221 comprises three inductors 501, 503, 505 arranged in series. Inductor 503 and inductor 505 are each in parallel with switches 401*a*, 401*b*, respectively. When either of the switches 401*a*, 401*b* is in the shorted position, the associated inductor 503 or 505 will be shunted and effectively removed from the electrical length of the antenna 500. The control circuitry for the switches 401*a*, 401*b*, including the $V_{dd}$ 507, the Cntrl 209*a*, 209*b*, and the Gnd 511 are isolated from the RF current of the antenna 500 by RF chokes 211.

Control signals 509*a* and 509*b* control switches 401*a* and 401*b*, respectively. If the voltage from control signal 509*a* is sufficient to forward bias and short switch 401*a*, then inductor 503 is shunted from the antenna circuitry 211. Likewise if the control signal 509*b* is sufficient to forward bias and short switch 401*b*, then inductor 505 is shunted from the antenna circuitry 221. If both switch 401*a* and 401*b* are open, then the antenna circuit 221 includes inductors 501, 503 and 505. The antenna may be tuned to a wide spectrum of frequencies and closer proximity of resonant point between subsequent ranges may be achieved through the use of a plurality of lengtheners 501, 503 and 505 and switches 401*a* and 401*b*. The example of FIG. 5 allows two switch cells (401*a* and 401*b*) to create 4 different frequency bands, the inductors 503 and 505 do not have to be of equal inductance, thus combination 501 and 503 is different than 501 and 505.

Figure 7:
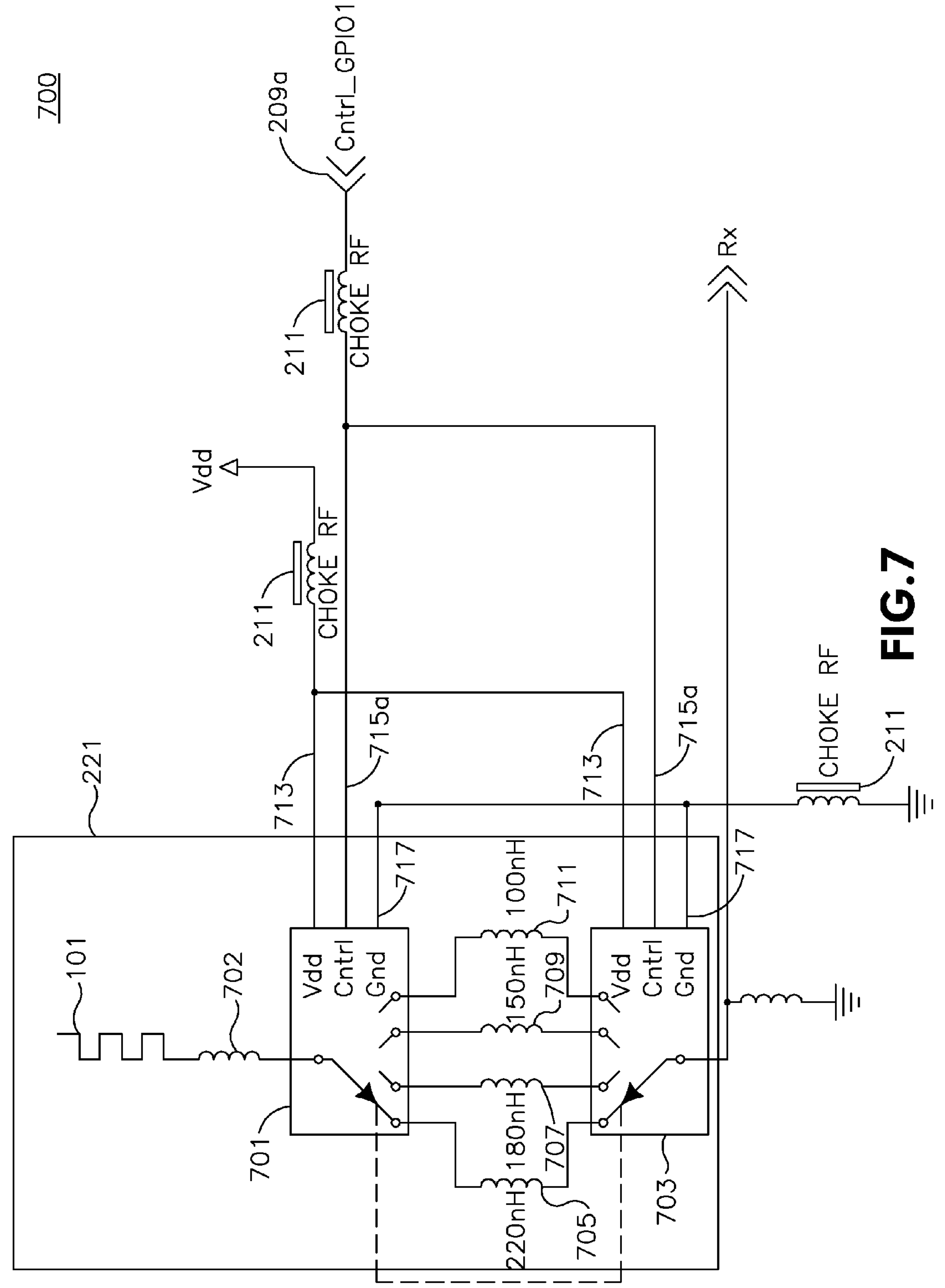
FIG. 7 is a schematic of a tunable antenna using two single pole/multi throw switches.

An alternative embodiment of a tunable antenna 700 is shown in FIG. 7 where the antenna circuit 221 includes two single pole, four throw (SP4T) RF switches 701, 703 in series with the antenna circuit 221 which also includes an inductor 702. Between the four throw positions of the SP4T switches 701, 703 are inductors 705, 707, 709, 711 of varying degrees of inductance. In this example, inductor 705 is 220 nH, inductor 707 is 180 nH, inductor 709 is 150 nH and inductor 711 is 100 nH. Depending on the position of the throw on the switches 701, 703, only one of the inductors 705, 707, 709, 711 will be included in the circuit. The inductance of the selected inductor 705, 707, 709, 711 will determine the electrical length of the antenna 101 and therefore, the resonant frequency. Switches 701, 703 are controlled by a common control signal that originates from a GPIO 209 in the receiving device. The control circuit containing the Vdd 713, Cntrl 715*a*, and Gnd 717 is isolated from the RF current of the antenna 101 circuitry by RF chokes 211. The controls of the RF switches 701, 703 do not carry any RF current and serve only to add or remove inductors from the antenna circuit 221 as desired.

By way of example, FIG. 7 depicts the throw in a position resulting in inductor 705 being included in the antenna circuitry 221 thereby adding 220 nH to the inductance of the antenna circuit 221. It is preferable to use two switches 701, 703 in this embodiment because the use of only one SP4T switch would cause the unselected inductors to be connected to the RF circuit as stubs and would cause undesired reactance that would affect the resonant point of the antenna. Switches 701, 703 are selected having good channel isolation, and low capacitance in an open state to prevent unwanted resonance characteristics from the reactive components inherent in the switch itself.

Figure 8:
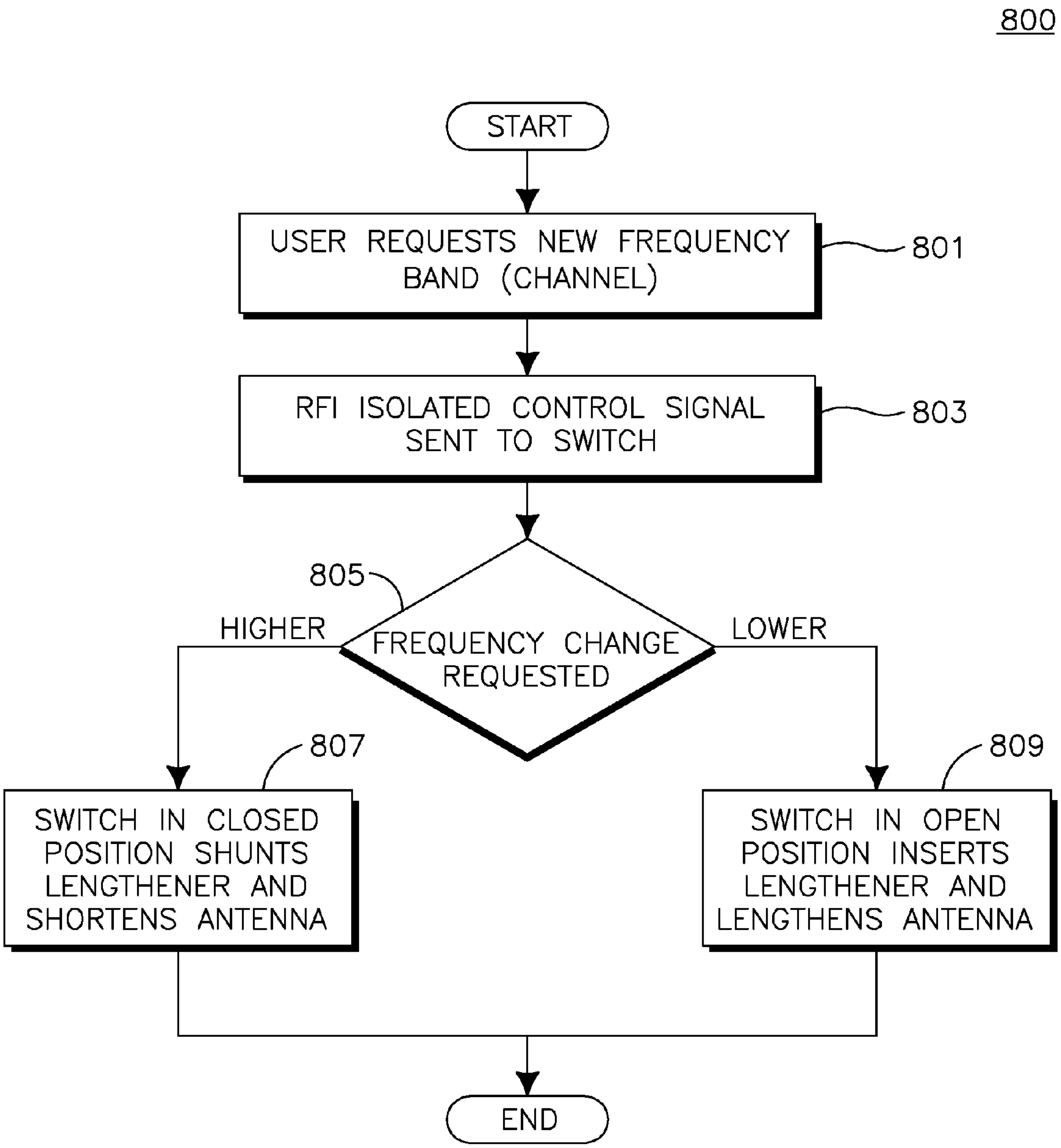
FIG. 8 is a flow diagram of a method of changing the electrical length of an antenna.

A method of tuning an antenna to a small band of frequencies within a wide spectrum 800 is shown in FIG. 8. The method 800 begins when a user requests a new frequency (block 801). For example, if a user were to change the channel on a digital television configured as part of a wireless handheld device, the user interface on the device may display a channel selector where the user may select a channel through the operation of a button, touchscreen, or another input device. A control signal that is isolated from the RF circuitry of the antenna is sent to one or more switches (block 803). Depending on the gap between the currently tuned frequency and the requested frequency, one or more lengtheners may be added and/or removed to achieve the required change in resonant frequency. Block 805 indicates that the change in frequency may tune the antenna to a higher frequency, in which case the RF switch is closed and a lengthener is shunted (block 807), or the requested frequency may be lower, in which case the RF switch is opened, thereby inserting the lengthener and lengthening the antenna (block 809). The method 800 may be repeated adding and shunting a plurality of lengtheners to achieve the desired inductance in the antenna circuit that results in a resonant frequency that matches the frequency requested by the user. The antenna tuner will be adjusted by the processor in accordance with the TV tuner, relevant criteria may be Received Signal Strength Indicator (RSSI), Signal to Noise Ratio (SNR) or a simple look-up table that connects various TV channels to appropriate antenna lengths.

Although the features and elements are described in particular combinations, each feature or element may be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

What is claimed is:

1. A non-transitory computer-readable storage medium containing a first set of instructions, which, when executed by a processor, allow the processor to:

request a channel, wherein the channel corresponds to a frequency for transmission and reception of an antenna;

transmit a switching control signal to a radio frequency (RF) switch associated with an antenna lengthener;

isolate the switching control signal from the RF energy received by the antenna; and operate the RF switch, wherein operating the RF switch includes operating a first diode switch to engage with one of a first ends of a plurality of conductive lengthening elements connected in parallel, and operating a second diode switch to engage with a second end of the conductive lengthening element for which the first diode switch is engaged, such that a single one of the plurality of parallel conductive lengthening elements is connected in series to a second conductive element.

2. The non-transitory computer-readable storage medium of claim 1 wherein the antenna is embedded in a cellular phone.

3. The non-transitory computer-readable storage medium of claim 1 wherein a requested channel corresponds to a frequency designated for Digital Video Broadcast for Handheld (DVB-H).

4. The non-transitory computer-readable storage medium of claim 1 wherein each diode is put into an open-state using negative bias.

5. The non-transitory computer-readable storage medium of claim 1 wherein the conductive lengthening elements connected in parallel are inductors.

6. The non-transitory computer-readable storage medium of claim 1 wherein the first and second diode switches are single pole/multi-throw (SPMT) diode switches connected in series with the conductive lengthening elements connected in parallel.

7. A non-transitory computer-readable storage medium containing a set of instructions, the set of instructions comprising:

a channel request code segment for requesting a channel, wherein the channel corresponds to a frequency for transmission and reception of an antenna;

a switch control signal transmission code segment for transmitting a switching control signal to a radio frequency (RF) switch associated with an antenna lengthener;

a switch control signal isolation code segment for isolating the switching control signal from the RF energy received by the antenna; and an RF switch operation code segment for operating the RF switch, wherein the operating includes operating a first diode switch to engage with one of a first ends of a plurality of conductive lengthening elements connected in parallel, and operating a second diode switch to engage with a second end of the conductive lengthening element for which the first diode switch is engaged, such that a single one of the plurality of parallel conductive lengthening elements is connected in series to a second conductive element.

8. The non-transitory computer-readable storage medium of claim 7 wherein the antenna is embedded in a cellular phone.

9. The computer-readable storage medium of claim 7 wherein each diode is put into an open-state using negative bias.

10. The non-transitory computer-readable storage medium of claim 7 wherein the parallel conductive lengthening elements are inductors.

11. The non-transitory computer-readable storage medium of claim 7 wherein a requested channel corresponds to a frequency designated for Digital Video Broadcast for Handheld (DVB-H).

12. The non-transitory computer-readable storage medium of claim 7 wherein the first and second diode switches are single pole/multi-throw (SPMT) diode switches connected in series with the plurality of conductive lengthening elements connected in parallel.

13. A non-transitory computer-readable storage medium containing a first set of instructions adapted to create a processor, wherein the processor is configured to implement a second set of instructions, the second set of instructions comprising:

a channel request code segment for requesting a channel, wherein the channel corresponds to a frequency for transmission and reception of an antenna;

a switch control signal transmission code segment for transmitting a switching control signal to a radio frequency (RF) switch associated with an antenna lengthener;

a switch control signal isolation code segment for isolating the switching control signal from the RF energy received by the antenna; and an RF switch operation code segment for operating the RF switch, wherein the operating includes operating a first diode switch to engage with one of a first ends of a plurality of conductive lengthening elements connected in parallel, and operating a second diode switch to engage with a second end of the conductive lengthening element for which the first diode switch is engaged, such that a single one of the plurality of parallel conductive lengthening elements is connected in series to a second conductive element.

14. The non-transitory computer-readable storage medium of claim 13 wherein the antenna is embedded in a cellular phone.

15. The non-transitory computer-readable storage medium of claim 13 wherein each diode is put into an open-state using negative bias.

16. The non-transitory computer-readable storage medium of claim 13 wherein the conductive lengthening elements connected in parallel are inductors.

17. The non-transitory computer-readable storage medium of claim 13 wherein a requested channel corresponds to a frequency designated for Digital Video Broadcast for Handheld (DVB-H).

18. The non-transitory computer-readable storage medium of claim 13 wherein the first and second diode switches are single pole/multi-throw (SPMT) diode switches connected in series with the conductive lengthening elements connected in parallel.

* * * * *